US012647152B2

(12) United States Patent
Albanese et al.

(10) Patent No.: US 12,647,152 B2
(45) Date of Patent: Jun. 2, 2026

(54) MULTI-FREQUENCY RIS ARCHITECTURE

(71) Applicant: NEC Laboratories Europe GmbH, Heidelberg (DE)

(72) Inventors: Antonio Albanese, Heidelberg (DE); Placido Mursia, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 18/838,615

(22) PCT Filed: May 9, 2022

(86) PCT No.: PCT/EP2022/062495
§ 371 (c)(1),
(2) Date: Aug. 15, 2024

(87) PCT Pub. No.: WO2023/156029
PCT Pub. Date: Aug. 24, 2023

(65) Prior Publication Data
US 2025/0175217 A1 May 29, 2025

(30) Foreign Application Priority Data
Feb. 17, 2022 (EP) .................................... 22157290

(51) Int. Cl.
*H04B 7/04* (2017.01)
*H01Q 3/46* (2006.01)
(Continued)

(52) U.S. Cl.
CPC .......... *H04B 7/04013* (2023.05); *H01Q 3/46* (2013.01); *H01Q 15/002* (2013.01); *H01Q 15/147* (2013.01); *H01Q 15/148* (2013.01)

(58) Field of Classification Search
CPC .... H04B 7/04013; H01Q 3/46; H01Q 15/002; H01Q 15/147; H01Q 15/148
See application file for complete search history.

(56) References Cited

U.S. PATENT DOCUMENTS 7,990,316 B2 * 8/2011 Cock ................... G01S 13/4463
342/372
10,502,825 B2 * 12/2019 Lys ....................... G01S 13/882
(Continued)

FOREIGN PATENT DOCUMENTS

WO WO 2004/093244 A2 10/2004

*Primary Examiner* — Jean B Corrielus

(74) *Attorney, Agent, or Firm* — Leydig, Voit & Mayer, Ltd.

(57) ABSTRACT
A reflective device includes a control element and a reflective surface. The reflective surface includes a plurality of reflective elements, where each reflective element of the plurality of reflective elements has an antenna element and a phase shifter and is under control of the control element so as to reflect a radio-frequency (RF) signal incident on the reflective surface with an adjustable phase shift. An operating frequency of the reflective surface is configurable by at least a subset of the plurality of reflective elements being divided into a number of sub-elements that are individually switched via the control element from an activated state, in which a respective sub-element contributes to the reflection of the incident RF signal, to a deactivated state, in which the respective sub-element does not contribute to the reflection of the incident RF signal, and vice-versa.

15 Claims, 6 Drawing Sheets

(51) Int. Cl.
  H01Q 15/00 (2006.01)
  H01Q 15/14 (2006.01)

(56) References Cited

U.S. PATENT DOCUMENTS

2007/0069956 A1*  3/2007  Ozkar ................. H01Q 9/0442
                                                      343/702
2009/0146894 A1*  6/2009  Drexler ............... H01Q 3/2676
                                                      343/757
2009/0146895 A1*  6/2009  Drexler ................. H01Q 3/267
                                                      343/757
2021/0184362 A1    6/2021  Hong et al.
2022/0393758 A1*  12/2022  Besoli ................. H04B 7/0874
2024/0259052 A1*   8/2024  Wang ................. H04L 27/2602

* cited by examiner

MULTI-FREQUENCY RIS ARCHITECTURE

CROSS REFERENCE TO RELATED APPLICATIONS

This application is a U.S. National Phase application under 35 U.S.C. § 371 of International Application No. PCT/EP2022/062495, filed on May 9, 2022, and claims benefit to European Patent Application No. EP 22157290.2, filed on Feb. 17, 2022. The International Application was published in English on Aug. 24, 2023 as WO 2023/156029 A1 under PCT Article 21 (2).

FIELD

The present invention relates to a reflective device and to a method for operating the same.

BACKGROUND

Reconfigurable Intelligent Surfaces (RISs), also known as Intelligent Reconfigurable Surface (IRS), are one of the most promising disrupting technologies for the upcoming cellular network generations. In short, RIS are radio-frequency (RF) reflectors whose response to impinging signals is programmable from a centralized controller. In particular, their ability to backscatter or phase-shift the impinging electromagnetic waves makes the wireless radio channel a variable to be optimized rather than a black box to be mitigated.

One of the most important applications of a RIS is to realize passive beamforming onto reflected signals: reflected energy can be maximized towards the direction of the user, in a programmable manner. To this end, an array of antenna elements or unit cells (both terms are sometimes used interchangeably in the present disclosure) apply different phase shifts to the signals each of them reflects. These electromagnetic waves constructively interfere in a specific direction and they must generate a sufficiently narrow beam to serve the selected user without meddling with unwanted devices. No signal processing or amplification devices are involved, but only essential and low power circuit components, i.e., passive beamforming.

Although RISs may be equipped with radio frequency (RF) chains that are able to demodulate and process incoming signals, their primary applications will leverage the operation technique described above, which is referred to as reflection mode and which minimizes weight, complexity and energy consumption. In this way, RISs will be manufactured as inexpensive sheets of thin composite materials achieving the ubiquity expected at their mature development stage (for reference, see Albanese, V. Sciancalepore and X. Costa-Pérez, "First Responders Got Wings: UAVs to the Rescue of Localization Operations in Beyond 5G Systems," in IEEE Communications Magazine, vol. 59, no. 11, pp. 28-34, November 2021, doi: 10.1109/MCOM.101.2100273).

RISs in reflection mode can only reflect the incident signals with a variable angular shift given by their current configuration, which defines the phase shifts introduced by each of its antenna elements/unit cells.

To date, RISs are designed as reflectarrays wherein each element consists of an inexpensive reflecting material, such as a patch antenna, a PIN diode or a varactor diode, which can be tuned according to the desired RIS beamforming configuration (for reference, see Q. Wu, S. Zhang, B. Zheng, C. You, and R. Zhang, "Intelligent reflecting surface aided wireless communications: a tutorial," IEEE Transactions on Communications, vol. 69, no. 5, pp. 3313-3351 May 2021).

RIS element designs available in the literature today may be divided in two main categories, namely i) designs based on PIN or varactor diodes (for example, see, e.g., L. Dai, B. Wang, M. Wang, X. Yang, J. Tan, S. Bi, S. Xu, F. Yang, Z. Chen, M. Di Renzo, and L. Hanzo, "Reconfigurable Intelligent Surface-Based Wireless Communication: Antenna Design, Prototyping and Experimental Results," in IEEE Access, pp. 1-9, 2019), and ii) designs based on patch antennas (for example, see, M. Dunna, C. Zhang, D. Sievenpiper, and D. Bharadia, "ScatterMIMO: enabling virtual MIMO with smart surfaces," in 26th Annual International Conference on Mobile Computing and Networking, 2020, pp. 1-14).

In the first category, diodes are mounted on top of a ground plane, which is used to suppress backward radiation, and the diodes are used to selectively activate different metal patches. Typically, in this case the bandwidth of influence is large (in the order of several hundreds of MHz) and may cause unwanted out-of-band interference. Moreover, the phase-shifting capability is limited in the case of PIN diodes, since they only allow a 1-bit phase shift, and extremely costly in the case of varactor diodes, since they may require a wide range of biasing voltages.

The second category is characterized by patch antennas mounted on a printed circuit board (PCB) with a ground substrate and connected to different waveguides of suitable length via an RF switch. The phase-shift applied to the incoming signal is proportional to the length of each waveguide, and the RF switch states across the array are chosen depending on the intended passive beamforming pattern. Such design exhibits a relatively narrowband behavior (up to 100 MHz) and cost efficiency of the implementation.

It is important to highlight that in both categories, the operating frequency depends on the material and dimension of the components, as well as the substrate thickness, which is fixed by design. Thus, it cannot be changed on-demand, thereby requiring deep hardware modifications. Accordingly, current state-of-the-art RIS designs do not support different carrier frequencies while preserving a sufficiently narrow bandwidth of influence as to avoid interfering with other operators and a sufficiently high antenna efficiency in terms of scattering parameters.

SUMMARY

In an embodiment, the present disclosure provides a reflective device, including a control element and a reflective surface. The reflective surface includes a plurality of reflective elements, where each reflective element of the plurality of reflective elements has an antenna element and a phase shifter and is under control of the control element so as to reflect a radio-frequency (RF) signal incident on the reflective surface with an adjustable phase shift, wherein an operating frequency of the reflective surface is configurable by at least a subset of the plurality of reflective elements being divided into a number of sub-elements that are individually switchable via the control element from an activated state, in which a respective sub-element contributes to the reflection of the incident RF signal, to a deactivated state, in which the respective sub-element does not contribute to the reflection of the incident RF signal, and from the deactivated state to the activated state.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
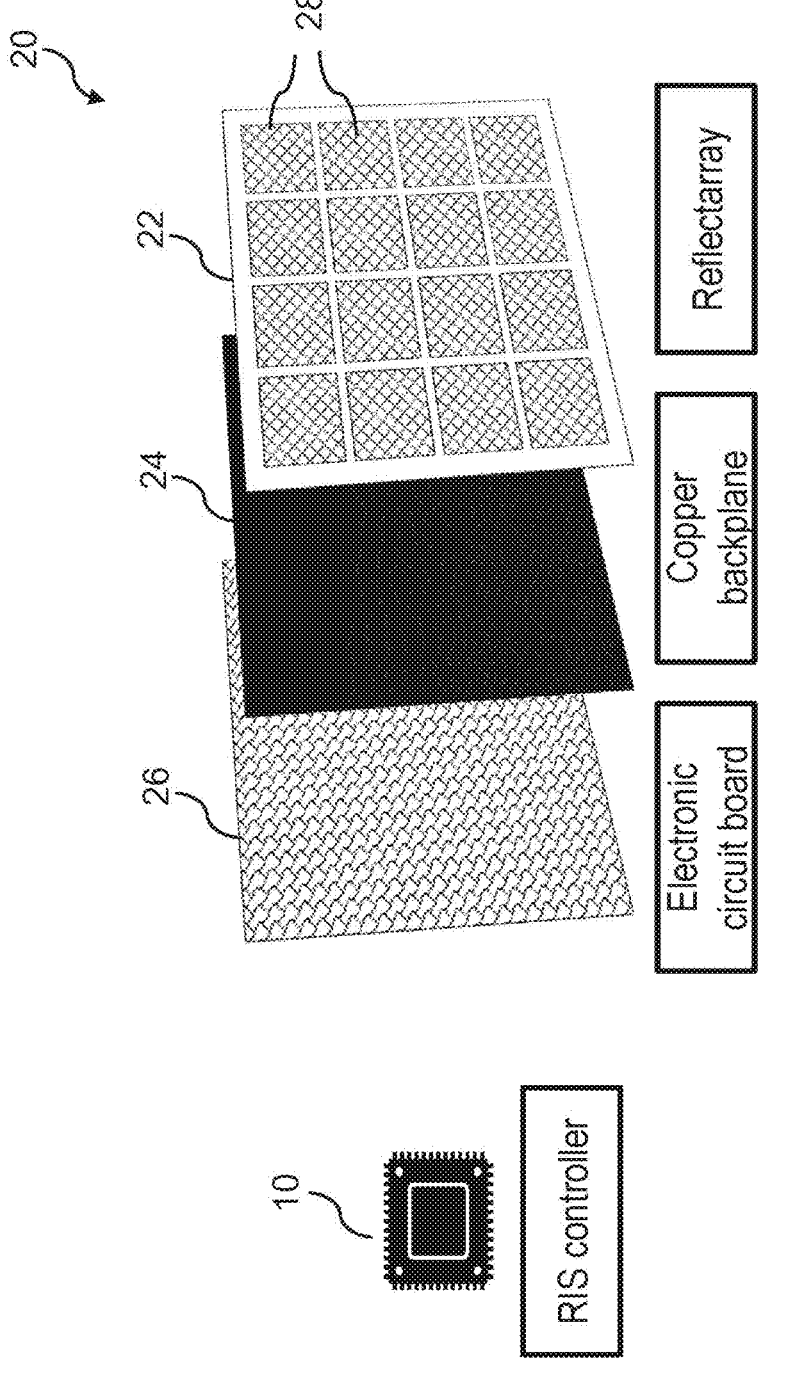
FIG. 1 is a schematic view illustrating a conventional RIS hardware structure according to prior art.

In accordance with an embodiment, the present invention improves and further develops a reflective device and a method for operating the same in such a way that multiple operating frequencies are supported, thereby allowing a more flexible deployment.

In accordance with an embodiment, the present invention provides a reflective device, comprising a control element and a reflective surface including a plurality of reflective elements, wherein each reflective element comprises an antenna element and a phase shifter and is under control of the control element so as to reflect a radio-frequency, RF, signal incident on the reflective surface with an adjustable phase shift, wherein the operating frequency of the reflective surface is configurable by at least a subset of the reflective elements being divided into a number of sub-elements that can be individually switched via the control element from an activated state, in which the respective sub-element contributes to the reflection of an incident RF signal, to a deactivated state, in which the respective sub-element does not contribute to the reflection of an incident RF signal, and vice versa.

Furthermore, in accordance with another embodiment, the present invention provides a method for operating a respective reflective device as specified above, the method comprising configuring the operating frequency of the reflective surface by individually switching sub-elements of the reflective elements via the control element from an activated state, in which the respective sub-element contributes to the reflection of an incident RF signal, to a deactivated state, in which the respective sub-element does not contribute to the reflection of an incident RF signal, and vice versa.

Embodiments of the present invention provide a novel and inexpensive RIS hardware design that enables RISs to dynamically support different reconfigurable frequencies with virtually no performance degradation, thereby allowing a more flexible RIS deployment. This can be efficiently exploited by network operators while performing frequency selection across their network. For instance, this may be particularly useful when considering future 5G and beyond networks, which are characterized by a heterogeneous population of users that may be operating at different frequencies.

According to embodiments of the invention, the novel hardware design allows a RIS to dynamically operate across different wireless channels by means of a tunable antenna array design. Specifically, support of different operation frequencies is achieved by dividing at least a subset of the reflective elements into a number of sub-elements. These sub-elements are configured in such a way that they can be individually switched via the control element from an activated state into a deactivated state, and vice versa. The different operational states are designed in such a way that a sub-element in the activated state contributes to the reflection of an incident RF signal, whereas a sub-element in the deactivated state does not contribute to the reflection of an incident RF signal, and vice versa. For instance, none-contribution to that reflection of an incident RF signal can be achieved by full absorption or (strong attenuation) of the incident signal. In fact, according to embodiments of the invention, the inter-spacing distance of the reflective elements (aka RIS unit cells) of the RIS/reflective surface are tuned to accommodate the RIS at multiple operating frequencies.

According to an embodiment of the invention, the phase shifter of a reflective element may comprise a number of different impedances and a switching logic that connects an input signal received via the antenna element of the reflective element to a specific one of the given impedances. Each of the different impedances introduces a dedicated phase shift on impinging signals upon reflection. As such, by selecting an appropriate impedance, the scattering behavior of the reflective surface can be adapted to the context.

According to an embodiment of the invention, the different impedances of the phase shifters may include a specific impedance that matches the characteristic impedance of the antenna element of the reflective element. Accordingly, by selecting this specific impedance, and impinging signal will be dissipated and an unwanted reflection of the signal is prevented. In fact, selection of this specific impedance effectuates a de facto deactivation of the respective reflective element, thereby also changing the inter-element spacing.

According to an embodiment of the invention, it may be provided that the different impedances of the phase shifters are tunable via the control element. In this way, it is possible to adapt that device to the different supported operating frequencies, thereby further enhancing its flexibility with regard to different deployment scenarios.

According to an embodiment of the invention, upon fabrication of the RIS device, the physical inter-element spacing D between the reflective elements of the reflective surface may be set to be $D=\lambda_{min}/2$, where $\lambda_{min}$ is the wavelength that corresponds to the maximum operating frequency that the device should be able to support. This design principle considers the fact that, by switching off certain reflective elements as described herein, it is possible to increase the effective inter-element spacing, but that, on the contrary, it is not possible to reduce the inter-element spacing below the initial fabrication value D.

According to an embodiment of the invention, the sub-elements of a reflective element may be interconnected by PIN diodes that are switchable via the control element. Accordingly, by suitably configuring the PIN diodes, it is possible to dynamically change the operating frequency of the RIS device.

According to an embodiment of the invention, the control element may be adapted to take the operating frequency as input parameter for determining an optimized configuration of the reflective surface.

According to an embodiment of the invention, the control element may be adapted to determine an activation profile for the reflective surface. The activation profile may include a subset of active reflective elements and corresponding activated sub-elements, together with an adjusted phase shift for each active reflective element.

According to embodiments of the invention, the RIS hardware design enables to take several performance parameters, such as CSI (Channel Stat Information), QoS, operating frequency, etc., as input scattering parameters for RIS optimization to generate a configuration of the phase shifts allocated at each of the reflective elements of the reflective surface. Further, RIS optimization may be configured to output an activation profile, i.e., active reflective elements and sub-elements.

According to an embodiment, the present invention provides a method for dynamic reconfiguration of the RIS working frequency, wherein the method comprises:

considering contextual RIS information (e.g. the deployment scenario of the device), selecting a desired RIS operating frequency and identifying target KPIs (such as the system sum rate, the sum mean squared error, the signal-to-leakage ratio, multicast rate, Jain's fairness index, etc.); and configuring the scattering parameters and identifying an activation profile of each reflective element of the RIS device that provide the best performance according to the identified target KPIs, in terms of desired operating frequency, effective number of RIS elements and inter-element spacing.

More specifically, according to an embodiment, the method may include the steps of selecting a desired operating frequency of the reflective surface based on contextual information of the reflective device and identifying one or more target KPIs. Furthermore, the method may include a step of determining an activation profile for the reflective surface at the desired operating frequency, the activation profile including a subset of active reflective elements and corresponding activated sub-elements, together with an adjusted phase shift for each active reflective element that provide the best performance according to the identified target KPIs.

According to an embodiment, the method includes the further step of implementing the identified activation profile by turning off/on RIS elements so as to modify the inter-element spacing and the effective number of RIS elements to i) achieve lower mutual coupling across the array and/or ii) create/suppress grating lobes. More specifically, it may be provided that the identified activation profile is implemented by turning off/on reflective elements by connecting, via the switching logic of a phase shifter, an input signal received via the antenna element of the respective reflective element to a specific impedance that matches the characteristic impedance of the antenna element of the reflective element. Alternatively, depending on the implementation, it may be provided that the identified activation profile is implemented by activating/deactivating sub-elements of a reflective element by switching PIN diodes that interconnect the sub-elements.

According to an embodiment of the invention, the reflective device may further comprise an on-board control unit and an electronic circuit board. The on-board control unit may be configured to receive an activation profile and a phase shift from the control element and to generate adapted control signals. The electronic circuit board may be configured to receive the control signals from the on-board control unit and to forward the control signals to the reflective elements and their sub-elements.

According to an embodiment of the invention, the phase shifters of the reflective elements and the physical inter-element spacing D between the reflective elements of the reflective surface may be adapted so as to support 2G and 4G sub-6 GHZ RATs as well as millimeter-wave 5G-and-beyond technologies.

There are several ways how to design and further develop the teaching of the present invention in an advantageous way. To this end, it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing FIG. 1 shows a conventional RIS hardware architecture according to prior art that mainly comprises a RIS controller 10 and a reflective surface 20. The reflective surface is typically made of three layers, including a reflectarray 22, a copper backbone 24, and an electronic circuit board 26. The reflectarray 22 is an array of reflecting elements 28 printed on a dielectric substrate. The copper backbone 24 is a copper metallic sheet arranged behind the reflectarray 22 to prevent signal leakage due to signal propagation through the RIS. Finally, the electronic circuit board 26 includes the circuitry dedicated to transporting the excitation currents and phase shift control inputs from the RIS controller to the reflectarray 22.

The passive beamforming capabilities of RISs arise from their array structure, which involves several reflecting elements 28, e.g. arranged in a regular 2D grid as shown in FIG. 1, introducing a configurable (often discrete in practice) phase shift on the impinging signals upon reflection.

The design choices of a RIS in terms of reflecting element technology, total number of elements, and inter-element spacing are of paramount importance since they directly affect the achievable performance of RIS-aided wireless networks. In particular, the particular RIS element material and size determines the operating frequency of the array and its efficiency in terms of scattering parameters, i.e., the absorption and reflection coefficients with respect to the incoming power. On the other hand, the total number N of RIS elements 28 determines the beamforming gain, which may increase the received signal-to-noise-ratio (SNR) at the receiver up to a factor proportional to $N^2$ (for reference, see again the above referenced document by Q. Wu et al.). Furthermore, the inter-element spacing determines the achievable directivity of the array. A common choice is to set such parameter equal to half a wavelength, since different values may lead to unwanted effects that negatively affect the overall system performance. Indeed, smaller values result in mutual coupling across the array while larger values may lead to grating lobes.

However, current state-of-the-art RIS designs do not support different carrier frequencies while preserving a sufficiently narrow bandwidth of influence as to avoid interfering with other operators and a sufficiently high antenna efficiency in terms of scattering parameters.

Embodiments of the present invention address this issue by providing a novel design for the reflectarray and the RIS controller to support multi-frequency operations. The RIS structure is able to operate at different frequencies by dynamically changing scattering parameters without the need to alter the RIS hardware. The RIS controller is based on a control signaling framework that instantaneously sets the scattering configuration and performs corresponding RIS elements activation, resulting in reconfigurable working frequency, effective number of RIS elements, and inter-element spacing to achieve target KPIs.

According to an embodiment, the novel RIS structure includes reconfigurable antennas with a modular design. Specifically, since the physical dimension of the antennas is inversely proportional to the operating frequency, according to an embodiment of the invention, each RIS element may be divided into a number of L sub-elements that can be alternatively activated via a specific control logic, as exemplary depicted in FIG. 2.

Figure 2:
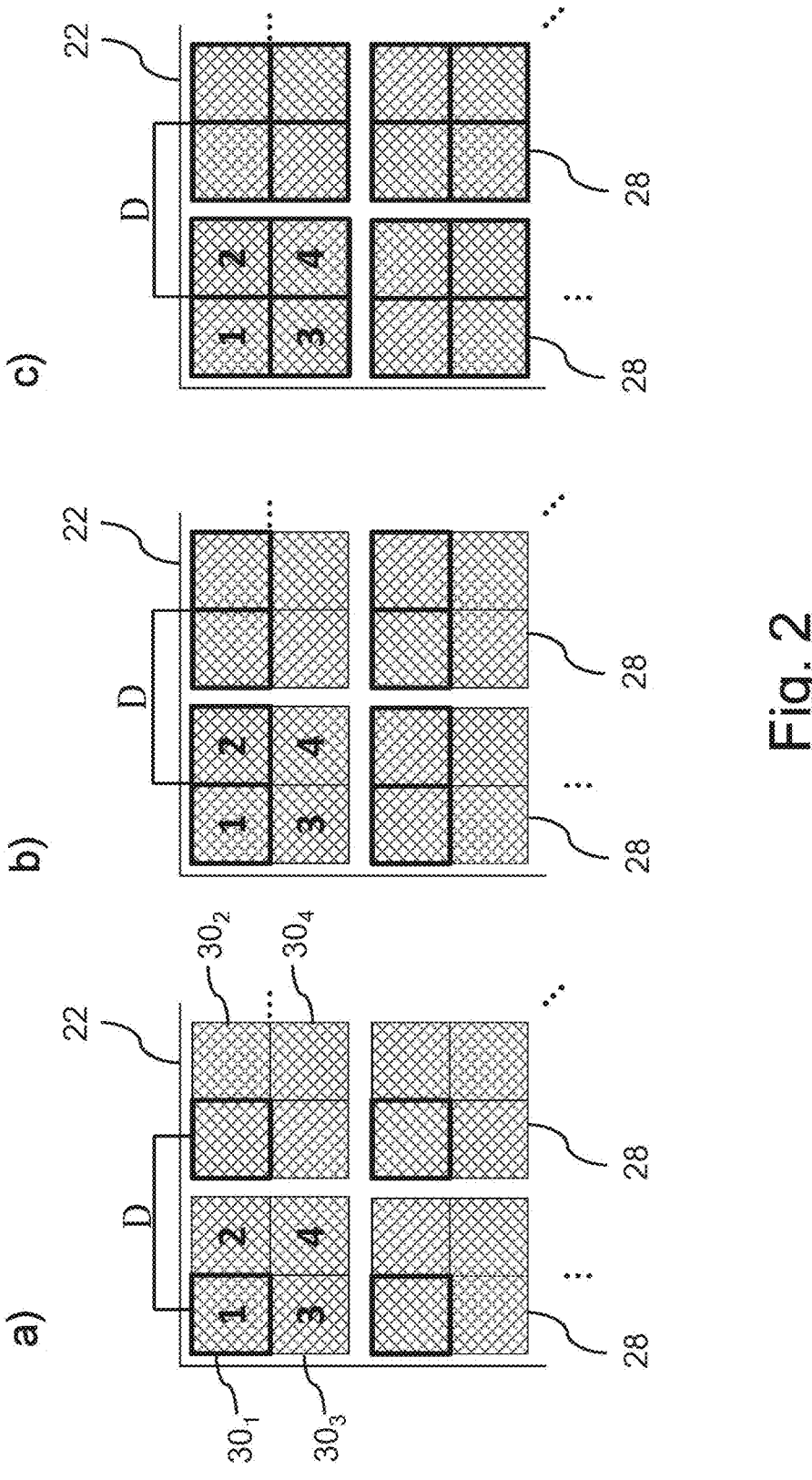
FIG. 2 is a schematic view illustrating a modular RIS design in accordance with an embodiment of the present invention.

FIG. 2, in which like reference numbers denote like components as in FIG. 1, exemplarily illustrates a reflectarray 22, where each of the reflecting elements 28 is divided into four equally sized sub-elements 30 (i.e. L=4). As will be understood, a different subdivision—e.g. with L=6 (in two rows and three columns, or vice versa), with L=9 (in a 3×3 array), etc.—is likewise possible.

In FIG. 2, the active sub-elements 30 of the reflecting elements 28 are highlighted in bold. Accordingly, in the situation illustrated in FIG. 2a), in each of the reflecting elements 28 of the reflectarray 22 the first (i.e. the upper left) sub-element $30_1$ is active. In FIG. 2b), the first and the second (i.e. two upper) sub-elements $30_1$ and $30_2$ are active, while in FIG. 2c) all four sub-elements $30_1$-$30_4$ are active.

In FIG. 2, the inter-element spacing between two adjacent reflecting elements 28 is denoted by D. It should be noted that the inter-element spacing remains constant and equal to D irrespective of the number of active sub-elements 30 per RIS antenna/reflecting element 28, as this measure is taken from the center of consecutive active sub-elements 30, as shown in FIG. 2. However, since the particular configuration of the active sub-elements 30 across the reflectarray 22 modifies the operating frequency of the RIS, the inter-element distance D may be, in general, different than the conventional half-wavelength, which is known to have particularly beneficial properties. In particular, the operating frequency of the reflectarray 22 decreases (or, alternatively the operating wavelength increases) with the number of active sub-elements 30 per antenna/reflecting element 28, leading to a decreased element spacing over wavelength ratio defined as $$\delta = \frac{D}{\lambda'}$$

which in turn translates into mutual coupling across the planar array 22. This has the effect of correlating the transmitted signal across different antennas and leads to performance losses if not taken into account. On the contrary, a lower number of active sub-elements 30 increases the operating frequency and hence the ratio 8, leading to grating lobes, i.e., secondary and uncontrollable lobes in the array response that spread energy in unwanted directions and may ultimately create interference. Both such effects negatively affect the quality of the communication.

According to an embodiment of the invention that aims at counteracting this issue, a matched load is added to each RIS element 28 that can be activated to absorb an incoming signal and to thereby effectively reduce the number of RIS elements 28. Such mechanism allows to increase the effective inter-element spacing as to reduce the mutual coupling across the array 22 at the cost of a lower number of active RIS elements 28.

Since it is not possible to, on the contrary, reduce the inter-element spacing below the value of D, according to an embodiment of the invention, during the initial fabrication of the RIS, the inter-element spacing D is set in order to obtain a half-wavelength spacing for the case of minimum value of signal wavelength (i.e., the maximum operating frequency). Hence, assuming that $\lambda \in [\lambda_{min}, \lambda_{max}]$ the inter-element spacing is set to $$D = \frac{\lambda_{min}}{2}.$$

Accordingly, by turning off RIS elements 28 it is possible to achieve alternative inter-element spacings of $$D' = \frac{\lambda_{min}}{2}k, k \in \mathbb{Z}.$$

Figure 3:
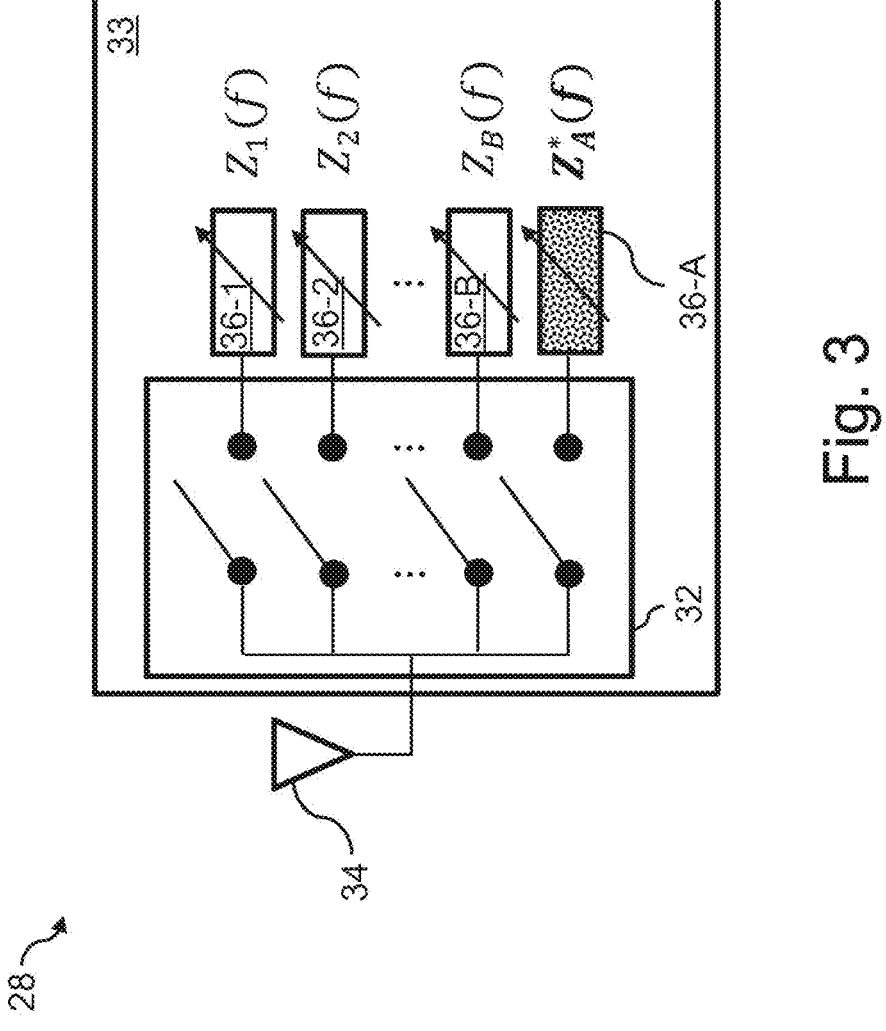
FIG. 3 is a schematic view illustrating the logical circuit of a RIS element in accordance with an embodiment of the present invention.

The schematic of each RIS element 28 according to an embodiment of the invention is exemplary illustrated in FIG. 3. Each RIS element 28 comprises an antenna element 34 and a phase shifter 33. Specifically, the phase shifter 33 comprises a switching logic 32 that connects an input signal received via antenna element 34 to a single given tunable impedance 361, . . . , 36B, denoted $$\{Z_b(f)\}_{b=1}^B,$$

where f is the operating frequency of the RIS element 28. Indeed, each impedance is designed as to realize a different phase-shift, at the given operating frequency f.

Compared to existing RIS designs, the phase shifter 33 of RIS element 28 according to the illustrated embodiment comprises an extra tunable impedance 36A, denoted $$Z_A^*(f),$$

which is matched to the characteristic impedance of the antenna 34, in order to absorb the entire power of an incoming signal and to thereby effectively "turn off" the corresponding RIS element 28.

Figure 4:
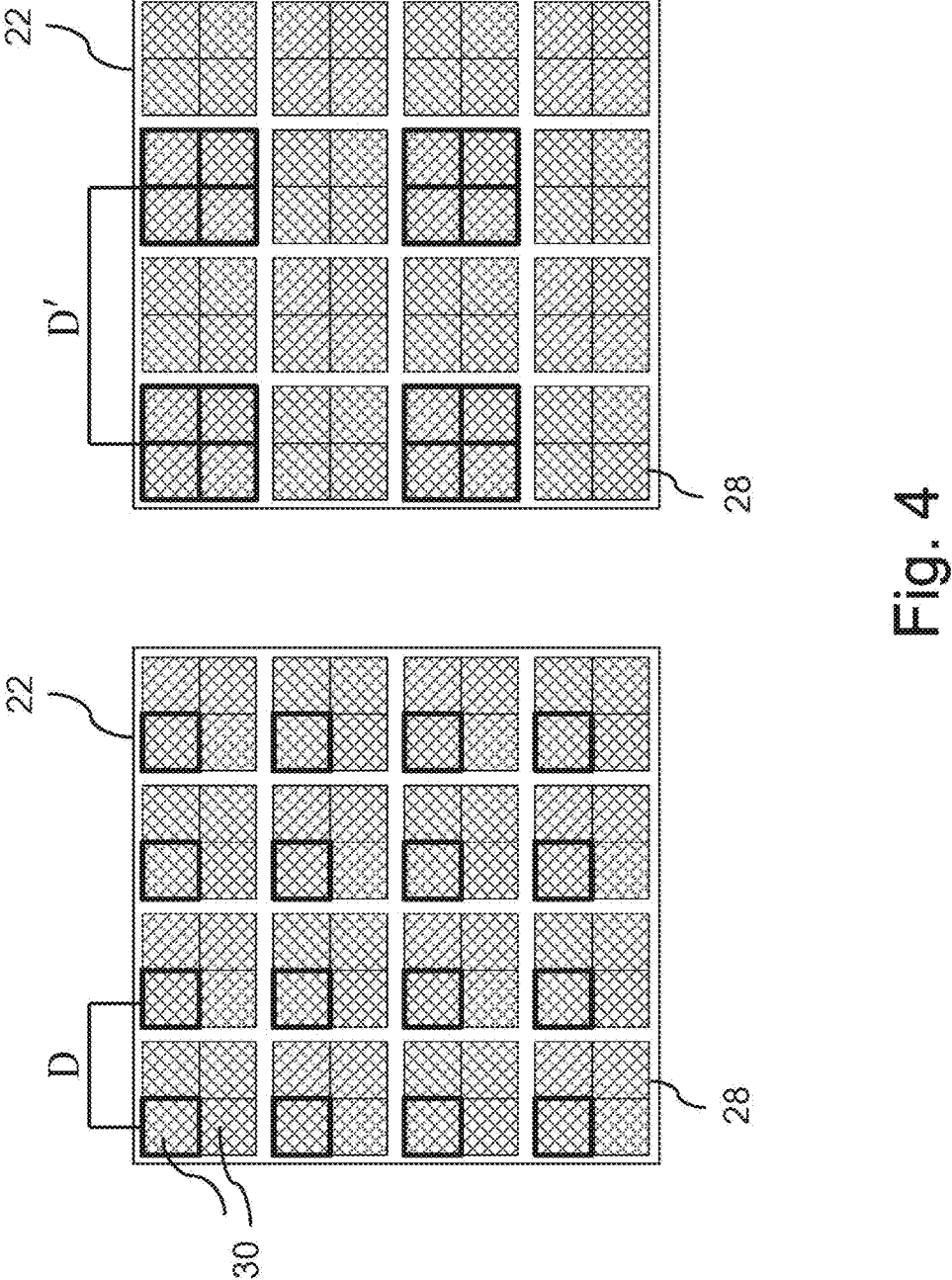
FIG. 4 is a schematic view illustrating examples of modular RIS configurations with different inter-element spacing in accordance with an embodiment of the present invention.

An example of possible RIS configurations in accordance with embodiments of the present invention is illustrated in FIG. 4. Like in the scenario of FIG. 2, each reflecting element 28 of the reflectarray 22 is divided into four sub-elements 30 (i.e. L=4). On the left-hand side, only one single sub-element 30 per reflecting element 28 is active across the array 22 (again indicated in bold). In this configuration, the operating frequency is high and the inter-element spacing is D.

On the other hand, when all four sub-elements 30 are active (for all reflecting elements 28 throughout the array 22), this would lead to a decrease in the operating frequency (due to the larger dimension of the reflective area) and mutual coupling across the array 22. To counteract this issue, the design according to embodiments of the present invention allows to restore independence over the antenna array by turning off RIS elements 28 and increasing the effective inter-element spacing, as shown on the right-hand side of FIG. 4.

In an embodiment, the present invention provides a RIS controller adapted to the novel reflectarray design as disclosed herein. In this context, it is important to note that RISs may improve the communication performance between a radio base station (BS) and user devices in several different relevant scenarios. State-of-the-art RIS optimization takes as input the channel state information (CSI) of the involved network devices, the physical geometry of the scenario, the target Quality-of-Service (QOS), etc., in order to derive a suitable configuration of the phase shifts to be introduced at each RIS element.

However, in light of the specific reflectarray design as disclosed herein and differently from conventional RIS optimization, a RIS optimization solution according to an embodiment of the invention is adapted to output an activation profile, i.e., the subset of active RIS-elements and the corresponding activated sub-elements. In particular, the latter depend on the network operating frequency, which, by virtue of the novel reflectarray design as disclosed herein, is now tunable, thereby constituting a novel input parameter for the RIS optimization.

Figure 5:
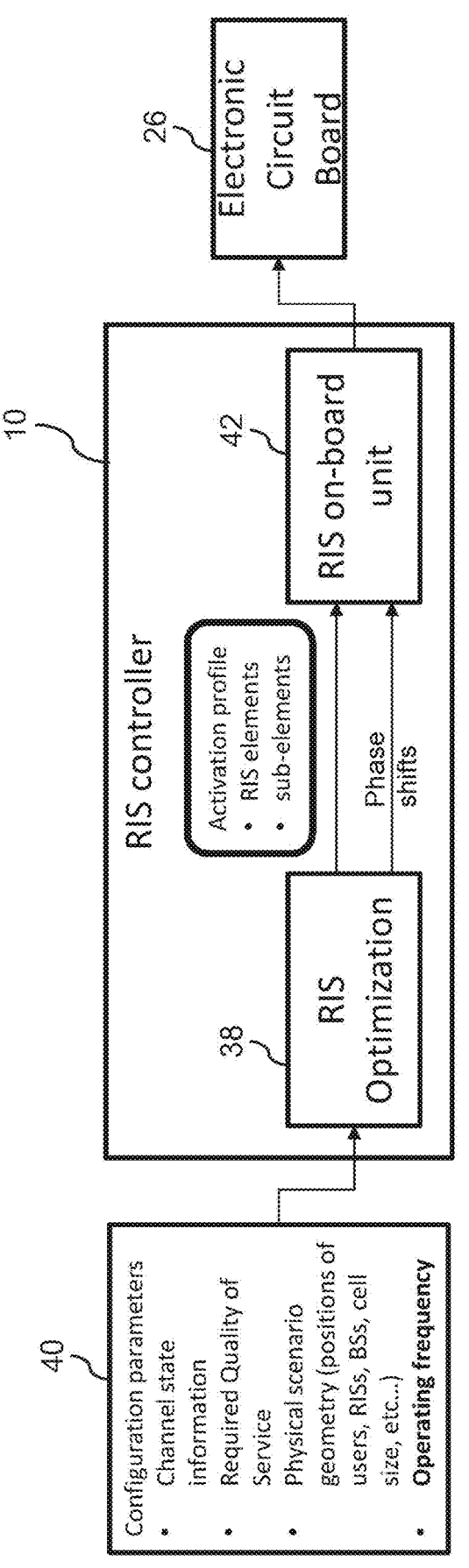
FIG. 5 is a block diagram illustrating the structure and operation of a RIS controller in accordance with an embodiment of the present invention.

FIG. 5 schematically illustrates a RIS controller 10 in accordance with an embodiment of the present invention, wherein novel components are highlighted in bold. Specifically, the RIS controller 10 is configured to perform the RIS optimization 38 based on predefined configuration parameters 40, including the operating frequency as well as conventional configuration parameters, such as the CSI of the involved network devices, the physical geometry of the scenario, the QoS, etc.

According to the illustrated embodiment, the RIS optimization 38 includes a determination of the activation profile (i.e. which RIS elements of the array are turned on/off and which of the sub-elements of turned on RIS elements are activated) as well as a determination of the phase shifts to be introduced at each turned on RIS element. The RIS optimization 38 can be performed by using standard techniques. After having derived a suitable configuration, the resulting activation profile and the selected phase shifts are propagated to the RIS on-board unit 42, which is the controller in charge of generating the control signals that will be transported by the electronic circuit board 26 to the RIS elements (and sub-elements) of the respective reflectarray.

As will be appreciated by those skilled in the art, the control of a multi-frequency RIS is not straightforward. By suitably optimizing the activation profile, it is possible to tune the inter-element spacing D and so the beamforming behavior of the RIS at different operating frequencies. Although high correlation among the elements and grating lobes are generally detrimental in normal operation conditions, the RIS design proposed according to embodiments of the invention allows taking into account the nature of the communication of which the RIS assists.

According to an embodiment of the invention, the RIS controller 10 aims at optimizing a particular network utility function, such as the signal-to-interference-plus-noise ratio (SINR), signal-to-leakage-plus-noise ratio (SLNR), sum rate, multicast rate, fairness, etc. For instance, in a broadcast scenario, one may take advantage of the grating lobes generated by a lower number of active elements as such secondary lobes would spread the signal energy in a wider angular range, thereby maximizing the multicast rate. Similarly, when serving a single user subject to severe pathloss, the beamforming gain may be prioritized to compensate for the high attenuation and maximize the sum rate.

Therefore, it is important to note that a multi-frequency RIS cannot be designed and operated just by leveraging on a conventional RIS architecture wherein the reflectarray is made of multi-frequency elements. The design of a multi-frequency RIS as proposed herein includes dynamically enables or disables elements and their sub-elements (by integrating matched loads to dissipate the impinging signals and preventing unwanted reflections), and suitably optimizes the corresponding RIS phase shifts. These two functions are not independent since more effective RIS beamforming capabilities may be unlocked by allowing for suboptimal inter-element spacing for the sake of achieving high QoS for a given communication scenario.

The time-scale at which the RIS controller according to the present invention is capable of reconfiguring the operating frequency and consequently the relevant RIS parameters (such as the activation profile and the phase shifts) depends on the particular electronic circuit board design, whereas the delay to activate the different sub-elements is typically negligible. Current designs allow for reconfiguration times in the order of milliseconds.

Patch-Antenna-Based Implementation

In order to realize a control logic that activates or deactivates each sub-element within a single RIS element, it is possible to utilize modular patch antennas interconnected via PIN diodes that enable fast switching (as described, for instance, in N. Aftab, H. T. Chattha, Y. Jamal, A. Sharif and Yi Huang, "Reconfigurable patch antenna for wireless applications," 2015 9th European Conference on Antennas and Propagation (EuCAP), 2015, pp. 1-3, which is hereby incorporated by reference herein). Accordingly, in an embodiment of the invention it may be provided that each RIS element (divided in a number of L sub-elements) comprises L patch antennas, interconnected via switching PIN diodes that can activate or deactivate each of the patch antennas.

Figure 6:
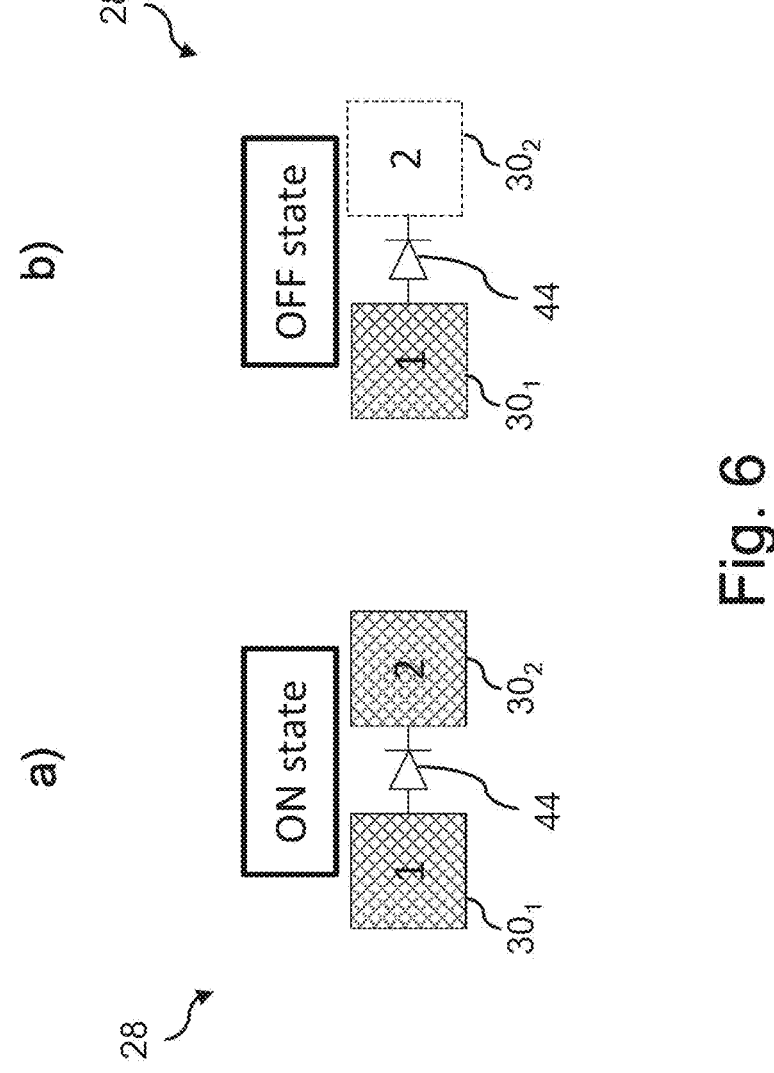
FIG. 6 is a schematic view illustrating a modular patch antenna design in accordance with an embodiment of the present invention.

FIG. 6 exemplary illustrates this principle of a modular patch antenna design for a RIS element 28 divided in two sub-elements $30_1$, $30_2$, which are interconnected by a PIN diode 44. In case of more sub-elements 30 per RIS element 28, the further sub-elements 30 would be interconnected by additional PIN diode 44 in the same way.

By switching the diodes 44 ON and OFF, this design is able to isolate portions of each RIS element 28, thereby changing its overall effective physical dimensions and scattering parameters. As a consequence, the operating frequency of the resulting RIS array decreases for increasing dimension of the total effective patch, which is the union of the active sub-elements 30.

Hence, with the modular patch antenna according to the embodiment of FIG. 6, it is possible to dynamically change the operating frequency by suitably configuring the switching PIN diodes 44. When the PIN diode 44 is in the ON state (see FIG. 6a), the corresponding patches are activated simultaneously and behave as one single reflecting element, and vice versa, if a PIN diode 44 is in the OFF state (see FIG. 6b), the corresponding patches are deactivated. In the simplest case, the L sub-elements 30 are interconnected in series, such that the first PIN diode 44 along the series that is in the OFF state interrupts the chain of sub-elements 30 being active.

According to an embodiment of the invention, in addition to manipulating the desired phase-shifting parameters at each RIS element, the RIS controller 10 may be configured to take care of activating or deactivating the PIN diodes 44 used for switching. Such task is particularly complex since the effective RIS array configuration depends on the instantaneous CSI, the physical propagation environment, the communication requirements such as the QoS, etc.

It is noted that with a PIN diode-based implementation as described above, the delay to activate the sub-elements is negligible (time scale of nano-seconds), leading to real-time reconfiguration of the working frequency of the RIS.

Moreover, according to an embodiment of the invention, assuming that there exists a discrete set of F operating frequencies $$\{f_i\}_{i=1}^F,$$

each phase-shifting impedance $Z_b(f)$ (as illustrated in FIG. 3) may be partitioned into F different sub-impedances $Z_b(f_i)$ to realize the corresponding phase-shifts for each one of the supported frequencies. A similar design can be adopted for the matched impedance $$Z_A^*(f_i)$$

that is used to effectively turn off the respective RIS element.

Multi-Rat Support

The proposed RIS design as described herein supports multiple Radio Access Technologies (RATs) deployed by network operators. As different RATs often operate on different frequency bands at regulated carrier frequencies, in an embodiment of the invention it may be provided that multi-frequency RISs are manufactured to support the frequency bands (and RATs) that may be required by a specific operator. As reference, a multi-frequency RIS may support conventional sub-6 GHZ RATs (e.g., 2G, 4G) as well as millimeter-wave 5G-and-beyond technologies.

Indeed, a network operator can operate the same RIS with multiple RATs by implementing a Time Division Multiplexing (TDM) approach, namely by selecting different operating frequencies over time based on operator-specific criteria such as traffic steering, resource allocation, frequency allocation and so forth.

Generic Multi-Frequency RF Device

According to an embodiment, the present invention provides a generic multi-frequency RIS element, i.e. a radiating element whose electric length can be tuned, so its scattering parameters.

The present invention readily applies regardless of the specific implementation of the multi-frequency RIS element. In particular, the sub-element configuration, as described above, can be mapped to the frequency tuning mechanism of the considered RIS element. In this way, the activation profile would consist of the subset of active RIS-elements and their scattering parameters configuration depending on the operating frequency.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A reflective device, comprising:
a control element; and
a reflective surface including a plurality of reflective elements, wherein each reflective element of the plurality of reflective elements comprises an antenna element and a phase shifter and is under control of the control element so as to reflect a radio-frequency (RF) signal incident on the reflective surface with an adjustable phase shift,
wherein an operating frequency of the reflective surface is configurable by at least a subset of the plurality of reflective elements being divided into a number of sub-elements that are individually switchable via the control element from an activated state, in which a respective sub-element contributes to the reflection of the incident RF signal, to a deactivated state, in which the respective sub-element does not contribute to the reflection of the incident RF signal, and from the deactivated state to the activated state.

2. The device according to claim 1, wherein the phase shifter of a reflective element comprises a number of different impedances and a switching logic that connects an input signal received via the antenna element of the reflective element to a specific one of the number of different impedances.

3. The device according to claim 2, wherein the number of different impedances include a specific impedance that match a characteristic impedance of the antenna element of the reflective element.

4. The device according to claim 2, wherein the number of different impedances are tunable via the control element to adapt to different supported operating frequencies.

5. The device according to claim 2, wherein a physical inter-element spacing D between the plurality of reflective elements of the reflective surface is $D=\lambda_{min}/2$, where $\lambda_{min}$ is a wavelength that corresponds to a maximum operating frequency to be supported.

6. The device according to claim 1, wherein the number of sub-elements of a reflective element of the plurality of reflective elements are interconnected by PIN diodes that are switchable via the control element.

7. The device according to claim 1, wherein the control element is adapted to take the operating frequency as input parameter for determining an optimized configuration of the reflective surface.

8. The device according to claim 1, wherein the control element is adapted to determine an activation profile for the reflective surface, the activation profile including a subset of active reflective elements of the plurality of reflective elements and corresponding activated sub-elements, together with an adjusted phase shift for each active reflective element of the plurality of reflective elements.

9. The device according to claim 1, further comprising:
an on-board control unit; and
an electronic circuit board;
wherein the on-board control unit is configured to receive an activation profile and a phase shift from the control element and to generate adapted control signals, and
wherein the electronic circuit board is configured to receive the adapted control signals from the on-board control unit and to forward the adapted control signals to the reflective elements and the number of sub-elements.

10. The device according to claim 5, wherein the phase shifters of the plurality of reflective elements and the physical inter-element spacing D between the plurality of reflective elements of the reflective surface are adapted so as to support 2G and 4G sub-6 GHZ Radio Access Technologies (RATs) and millimeter-wave technologies.

11. A method of operating the reflective device according to claim 5, the method comprising:
configuring the operating frequency of the reflective surface by individually switching sub-elements of the reflective elements via the control element from the activated state to the deactivated state, and from the deactivated state to the activated state.

12. The method according to claim 11, further comprising:
selecting a desired operating frequency of the reflective surface based on contextual information of the reflective device and identifying one or more target Key Performance Indicators (KPIs); and
determining an activation profile for the reflective surface at the desired operating frequency, the activation profile including a subset of active reflective elements of the plurality of reflective elements and corresponding activated sub-elements, together with an adjusted phase shift for each active reflective element of the subset of active reflective elements that provide a best performance according to the identified target KPIs.

13. The method according to claim 12, further comprising implementing the determined activation profile by:
turning off/on reflective elements by connecting, via the switching logic of the phase shifter, the input signal received via an antenna element of a respective reflective element to a specific impedance that matches the characteristic impedance of the antenna element of the reflective element, and/or
activating/deactivating sub-elements of a reflective element of the plurality of reflective elements by switching PIN diodes that interconnect the sub-elements.

14. The method according to claim 11, further comprising:
reducing mutual coupling across the plurality of reflective elements of the reflective surface and/or creating/suppressing grating lobes by specifically modifying the inter-element spacing and an effective number of reflective elements.

15. The method according to claim 11, wherein the phase shifters of the reflective elements of the plurality of reflective elements and the physical inter-element spacing D between the plurality of reflective elements of the reflective surface are adapted so as to support 2G and 4G sub-6 GHZ Radio Access Technologies (RATs) and millimeter-wave technologies.

* * * * *